United States Patent [19]

Nurmikko

[11] Patent Number: 5,709,165
[45] Date of Patent: Jan. 20, 1998

[54] FORAGING UNIT FOR AVIAN, MAMMALIAN AND REPTILIAN SPECIES AND METHOD OF USE

[76] Inventor: Mika Nurmikko, 40 Blueberry Ridge Village, North Berwick, Me. 03906

[21] Appl. No.: 622,887

[22] Filed: Mar. 29, 1996

[51] Int. Cl.[6] ................................................. A01K 15/02
[52] U.S. Cl. ..................... 119/51.01; 119/52.4; 119/702; 119/421; 119/462
[58] Field of Search ............................ 119/51.01, 51.03, 119/52.4, 53.5, 57.8, 57.9, 52.3, 62, 702, 221, 246, 208, 703, 704, 422, 429, 462, 473, 421, 417, 416, 482; 232/4 R, 4 D; 449/38, 19

[56] References Cited

U.S. PATENT DOCUMENTS

| | | | |
|---|---|---|---|
| D. 231,369 | 4/1974 | Kilham | 119/57.8 X |
| 3,260,236 | 7/1966 | Jones | 119/417 |
| 3,857,364 | 12/1974 | Miller, Jr. | 119/417 |
| 4,301,766 | 11/1981 | Piccone | 119/482 |
| 4,400,904 | 8/1983 | Baker | 119/52.4 X |
| 4,727,825 | 3/1988 | Houghton | 119/707 |
| 4,841,911 | 6/1989 | Houghton | 446/227 |
| 5,054,427 | 10/1991 | Hoover | 119/707 X |
| 5,078,094 | 1/1992 | Hoover | 119/707 |
| 5,275,125 | 1/1994 | Rotramel | 119/416 |
| 5,577,464 | 11/1996 | Wellington et al. | 119/482 X |

FOREIGN PATENT DOCUMENTS

| | | |
|---|---|---|
| 2253329 A | 9/1992 | United Kingdom . |
| WO8802215 A | 4/1988 | WIPO . |

OTHER PUBLICATIONS

Worley and Hare, "An overview of the 1995 Environmental Enrichment Conference," The Shape of Enrichment, vol. 4, No. 4, Nov., 1995, p. 6.

1995 Catalog of Primate Products, Inc.

Primary Examiner—Gene Mancene
Assistant Examiner—Yvonne R. Abbott
Attorney, Agent, or Firm—Chris A. Caseiro; Thomas L. Bohan

[57] ABSTRACT

A stimulative feeding device for use by animals. The device is designed as a function of the specific animal for which it is intended, with the underlying characteristic that the animal is required to use its natural foraging capabilities to recover food from the device. The device includes a basic structure having a plurality of cavities for retaining a supply of food for the animal. The basic structure is opaque so that the animal cannot see through it to observe some or all of the food. A portion or all of the cavities are hidden so that the animal is required to manipulate any hiding component in order to expose the food. The means for hiding the food can be as varied as the skill level of the animal for which it is intended. The device is not designed to teach the animal, but is instead designed to occupy that animal's time through activities that it would ordinarily carry out while in its natural environment. Although the device may be configured to suit most any animal, particularly those in captivity, attention is directed to avian, mammalian, and reptilian species.

18 Claims, 15 Drawing Sheets

FORAGING UNIT FOR AVIAN, MAMMALIAN AND REPTILIAN SPECIES AND METHOD OF USE

BACKGROUND OF THE INVENTION

1. Technical Field

The present invention relates to devices and techniques for entertaining and otherwise keeping animals preoccupied. More particularly, the present invention relates to devices and techniques for delivering to an animal a supply of food in a way that utilizes the animal's normal food gathering techniques. Still more particularly, the present invention relates to a foraging unit installable on or within a confinement space.

2. Description of the Prior Art

There are presently many million animals in this country that are confined in some way, whether in private homes, in laboratories, in zoos, etc. These animals, whether they be cats, dogs, birds, primates, rodents, small and large non-domestic carnivores, herbivores and insectivores, amphibians, reptiles, etc., are all generally fed in the same manner. They are given food in some sort of container, or the food is placed in close proximity to them for easy access. Most of these animals, particularly those that are not generally considered to be domestic (that is, not cats, dogs, common birds), have been removed from their original environments, or they are raised in artificial environments. They have little activity and therefore tend to be sedentary except during the short part of the day when food is delivered in easily accessed containers.

For animals located in zoos, parks and the like, there is little to do other than to watch for the food delivery for the day. The animals that are confined for research purposes have even less pleasant surroundings in that they are stuck inside buildings, generally in stark cages. There is essentially no activity for these animals. There are essentially no devices readily available for enhancing the lives of captive animals.

This problem was noted in the Second International Conference on Environmental Enrichment, held in Copenhagen, Denmark, in August, 1995. At that conference information was presented regarding the enrichment of the lives of captive animals. Devices described in a summary of that conference in *The Shape of Enrichment*, Vol. 4, No. 4, November, 1995, included simple feeding tubes and hiding arrangements designed to make the animal's captive environment something closer to that of the animal's natural environment. These devices fail in that they apparently do not provide sufficient stimulation over an extended period of time and they do not appear to be particularly efficient for humans to prepare and maintain.

A few other attempts have been made to create tools for enriching the lives of animals in captivity. In particular, a device described by Houghton (U.S. Pat. No. 4,727,825) provides a maze for the education of primates—only of the type of sufficient intellect to solve the puzzle. The device is designed to be set in place on a cage. It includes a set of slots into which the primate places its hand in order to reach food located within an interior region. The interior region includes pathways that the primate is required to learn in order to discover the food. The pathways may be varied as desired, but the slots are apparently all of the same size. The problem with the Houghton device is that it is designed as a training tool rather than as a means to maintain a reasonable level of interest on the part of the animal. Food is used simply as a means to train the animal to perform a particular activity in a specific way. Upon obtaining the food the animal has achieved the goal and the activity ceases. The time spent in obtaining the food may be relatively minimal. The remainder of the animal's waking hours are thus spent in the same manner as is ordinarily experienced. Further, the device apparently is not sufficiently adaptable to be transferred to use by other species.

The Primate Products, Inc., company of Redwood City, Calif., offers two devices apparently designed to occupy a primate's waking hours while in captivity. The Puzzle-Feeder (TM) is a clear box that is similar to the Houghton device in that it permits re-configuration of the interior of a maze-like puzzle, which may be filled with treats. At least two problems exist with this device. First, fabrication of the device from clear materials makes it dissimilar from certain significant types of natural foraging environments of primates. That is, apart from gathering food that is in plain sight, primates spend a significant amount of time digging into opaque food-containing elements, such as soil and trees, in order to gather their food. The entry ways into these food-containing elements vary widely in size and shape. Fabrication of the Puzzle-Feeder from clear plastic may cause frustration of the animal, or it may simply be much easier to obtain the treats than is ordinarily the case for the primate in the wild—if only because the treat can be seen. That cuts down the normal foraging period and leaves the captive animal with a considerable amount of idle time.

The other apparent problem with the Puzzle-Feeder is the human time required to prepare the device for use by the animal. The re-configurable parts must be moved almost daily if the animal is to be prevented from learning how to get at the treats that can easily be seen through the transparent plastic. The taking apart of the device, whether to re-configure the interior or to re-fill it, and to sanitize it, requires an expenditure of time and effort. Such an effort would be too costly in a location where there any more than a few animals to care for. Thus, in a laboratory in particular, the Puzzle-Feeder would likely not be cost-effective. In a zoo, where volunteers are often used to deliver food to animals, the time involved in rearranging the device and filling it would be less an issue.

The other device made available by Primate Products is the Prima-Forager (TM) device. That device is apparently designed to be attached to a cage. It is essentially a box to be filled with a material such as straw, wood chips, etc., throughout which the animal's food is spread. The animal is thus required to pick through the litter to obtain the food. This is the way that most captive creatures are presently fed. Unfortunately, it takes very little time for most primates to understand that the food is dispersed throughout the litter and to discover that food in a very short period of time. Given that the food is restricted to placement within a small box in the Prima-Forager, it is clear that the time required for the animal to find the food is very short. Thus, the problem with this device, as with all other present means for caring for captive animals, is that it fails to take advantage of the animal's natural foraging skills to keep that animal occupied throughout the course of the day.

Although the discussion to this point has focused on the stimulation of primates, it is to be understood that this is a problem for other captive animals. One class that is particularly large is the avian (bird) category, including, but not limited to those in the psittaciformes (hook-billed birds generally described as parrots) and passeriformes (perching birds such as finches, myna birds, etc.) orders. It is estimated that there are approximately 30 million captive birds presently held in public and private settings in this country alone.

Captive birds are normally fed in a manner similar to that used for other captive animals. That is, their food is placed in a container accessible by the bird. The food is therefore easily available and requires no effort on the part of the bird to obtain it. This naturally lends itself to resultant boredom for the bird. In contrast, in their natural habitats, these animals spend a significant portion of their day foraging in an almost continuous search for food.

While it is not possible to simulate an environment of the scope available to a bird in the wild, it would be beneficial to provide some stimulative activity to occupy a captive bird's time. There are many products commercially available that are intended to be "toys" for birds. However, these devices suffer from the basic problem that they do not provide the bird with sufficient incentive to use them after the bird has figured them out. For example, there exist puzzles that require the bird to move an item from one location to another, possibly in exchange for a treat. There are also toys that when moved create a sound so that the bird is supposed to be stimulated to repeat the movement in order to repeat the sound. There are, however, no devices that take advantage of a bird's natural foraging capability to keep the bird occupied for extended periods of time.

Captive reptiles are in a similarly difficult situation regarding time-consuming activities. Their feeding habits, however, are distinct from the other animals noted in that they tend to eat one meal and may not eat again for several days. Captive reptiles are typically fed in the manner noted for the other animals discussed herein. That is, the food is placed in a container—or in the reptile's housing—in plain view for the reptile to retrieve. Minimal effort is required to gather the food. In their natural environment, these animals must search for food—a time-consuming task. For snakes, for example, that generally involves tracing a scent to the location of the creature creating that scent. Once that creature is caught and eaten, the snake will not eat for days. In order to keep such an animal occupied then, it would be necessary to provide a device that would require the reptile to spend a significant amount of time locating that single parcel of food.

Therefore, what is needed is a device that keeps a captive animal preoccupied and stimulated for an extended period of time. What is also needed is such a device that takes advantage of an animal's natural instincts in seeking food as a means for not only feeding that animal but for keeping that animal mentally stimulated for an extended period of time. Such a device would not be used as a tool to train an animal, but would be designed simply to stimulate the animal in order to enhance its well-being. What is further needed is such a device that is simple for humans to prepare and maintain and that is relatively inexpensive.

SUMMARY OF THE INVENTION

It is an object of the present invention to provide a device that keeps a captive animal preoccupied and stimulated for an extended period of time. It is also an object of the present invention to provide such a device to be used by captive animals that takes advantage of such animals' natural instincts in seeking food as a means for not only feeding that animal but for keeping that animal mentally stimulated for an extended period of time. Such a device would not be used as a tool to train an animal, but would be designed simply to stimulate the animal in order to enhance its well-being by enriching its environment. It is another object of the present invention to provide such a stimulative feeding device that is simple for humans to prepare and maintain and that is relatively inexpensive.

These and other objectives are achieved in the present invention through the design of a device custom-oriented to the foraging techniques—as well as the physical and mental capabilities—of any captive animal. The device preferably is a basic structure that is designed to hold food for the animal in a way that requires the animal to use a significant part of the day to recover that supply of food. Depending upon the type of animal, that supply may be the animal's complete daily intake, or a significant portion thereof. One primary characteristic of the basic structure, regardless of the particular animal-type for which it is designed, is its opacity. That is, the device is fabricated so that some or all of the animal's food supply is hidden from view on or in the device. In this way, the animal can never be absolutely certain that it has recovered all of the food. The transparency of the previous devices described fail to stimulate the animal in that way because the animal can observe immediately whether any food remains.

It is contemplated that the device of the present invention will come in many sizes, shapes, and designs. In addition to the underlying common requirement that it hide food from the animal is the requirement that the food be hidden in a way that reasonably stimulates the foraging practices of that animal. It is well known that the class of animals defined as primates includes a variety of animals of different skill levels. For example, the cebus monkeys have considerable intellect and will therefore be able to solve a relatively simple task in short order. The less-skilled saimiri, on the other hand, may take much longer to solve the same task. It is necessary, then, to take this variation of skill into account, something that the prior feeding/teaching units fail to do. For this reason, the present invention includes means for hiding the food that is skill-oriented. Such means may be a cavity filled with food, or into which the food is recessed, and that is too small for any of the animal's grasping appendages to enter. This would require the animal to find or fabricate a tool to insert into the cavity to recover the food. A plurality of such cavities would require the animal to check every one. The cavities are designed to simulate holes that a primate may find in the wild, such as in a tree, in a termite mound, or in the soil. The animal would understand that those cavities may well contain something that it wishes to eat. If one or more of the cavities are too small for the primate's grasping appendage, it is required to find a stick (the tool) to be inserted into the cavity, and withdrawn to observe whether anything is clinging to the end of that tool. In the primate's natural environment for example, termites may be clinging to the tool. In captivity, something sticky, such as honey, peanut butter, etc., may be inserted into the cavities.

This is but one example of the stimulative means for hiding the animal's food supply in/on the device of the present invention. The device may also include holes large enough for the animal to insert its arm, leg, tongue, etc. Food may be placed on the back side of the device, requiring the animal to move its appendage around in the hopes of discovering the food. This too duplicates that which can occur in the wild. Attachments may also be affixed to, or inserted into, the basic device structure. These attachments can cover holes containing food, they may include hidden compartments discoverable by the animal, or a combination of the two. The attachments may simply be movable blocking units pivotably or slidably attached to the surface of the basic structure. Movement of these blocking units expose underlying holes. The attachments may also be supplemental holding elements such as drawer that the animal can pull partially out from the surface of the basic structure. Holes on the basic structure and/or in the pullable attachment can be exposed by the animal for the recovery of food.

It is easy to see that this focus on the skills of the particular animal lends itself to many device configurations. The primary components of the device, however, are an opaque basic structure made of a material sufficient to withstand exposure to the animal for which it is intended, and a set of food-retaining cavities. The basic structure may be as simple as a rectangular block of material or it may be fabricated to appear as a tree, a rock, a termite mound, or any other substrate that the animal may observe in its natural environment. The cavities may be directly observable by the animal or they may be blocked in some fashion. The cavities may be varied in cross-sectional dimensions and depth as a function of the particular animal for which it is intended. Blocking attachments may be relatively simple or complex. They may be movable along the surface of the basic structure or they may be movable in and out of the basic structure. The blocking structures may be basic shapes or they may be ornately designed to further provide a stimulative environment for the animal. The blocking attachments themselves may or may not contain food.

The present invention provides for stimulation of captive animals by requiring those animals to use their foraging skills to obtain the food that previously had simply been handed to them. In addition to the stimulation from the feeding activity, it is to be noted that the use of movable attachments on the basic structure, whether food-blocking attachments or not, may further enhance the animal's life. These movable attachments are preferably designed to make noise when moved. For many animals, and for primates in particular, making noise is a stimulative activity in itself. Thus, the device of the present invention occupies an animal's time as a feeding tool and as an amusement structure.

One key feature of the present invention is the ease of maintenance by those who attend to the animal. The cavities of the basic structure can be easily exposed by a human for insertion of food, on the front, rear, and within the basic structure. The device is designed to be removably attachable to the animal's cage, or if large enough, may remain as a fixture within the animal's pen or housing.

These and other advantages of the present invention will become apparent upon review of the submitted drawings, the detailed description of the device and process, and the appended claims.

DETAILED DESCRIPTION OF PREFERRED EMBODIMENTS OF THE INVENTION

The present invention is directed to a fundamental change in the way that captive animals are fed. As shown in the accompanying figures, the present invention has a variety of embodiments, and the ones presented are seen to be illustrative and not exhaustive. Generally, however, the fundamental component of a stimulative device 10 of the present invention is an opaque basic support structure 11. The support structure 11 is designed to be handleable by one or two persons and to retain a sufficient amount of food to feed one or more animals of the type for which the device 10 is intended, for one day. While the following discussion regarding details of specific designs of the stimulative device 10 focus on particular animal types, it is to be understood that reasonable variations may be made without varying from the underlying basic function of the device 10.

Figure 1A:
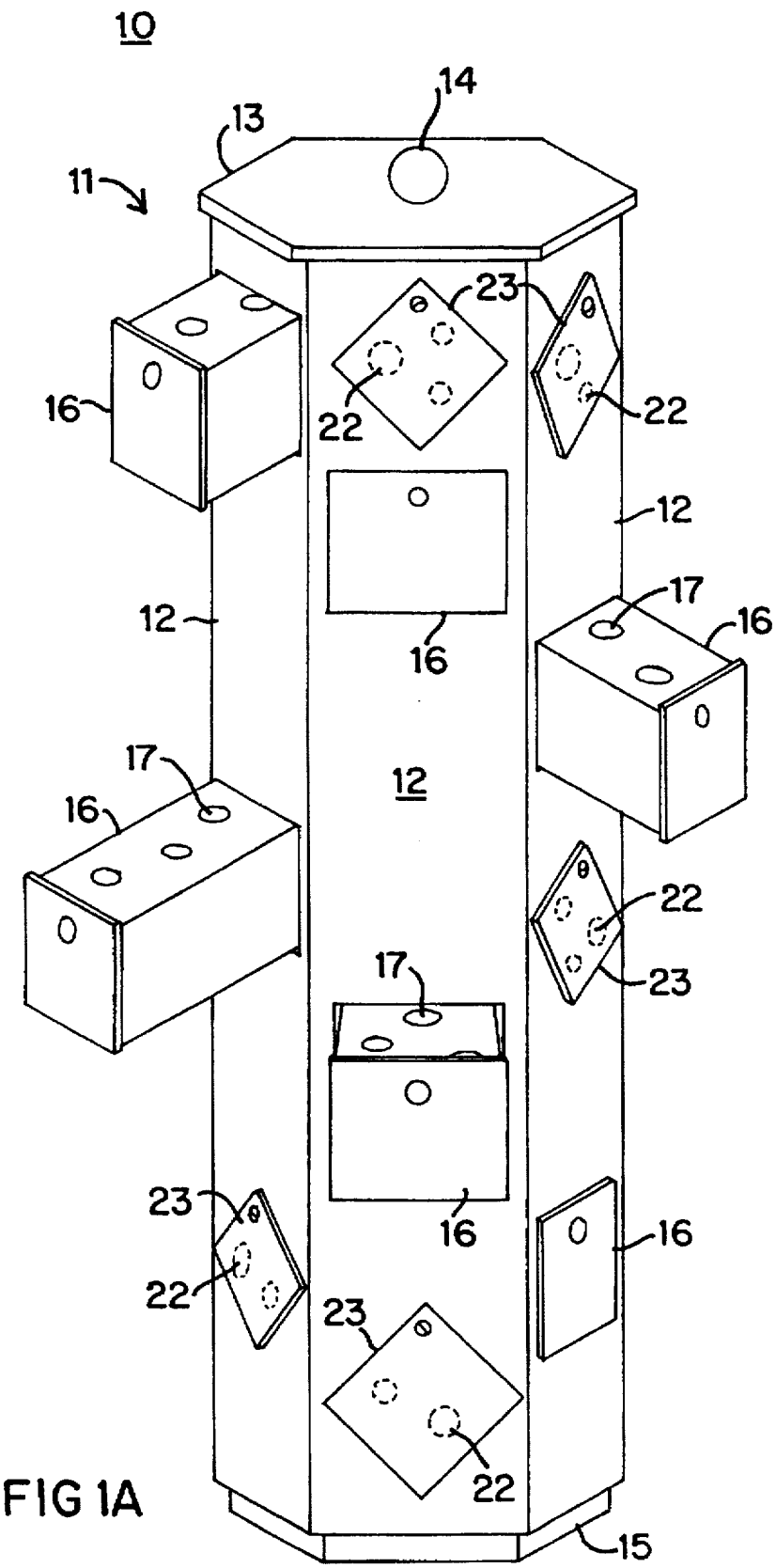
FIG. 1A is a perspective view of an embodiment of the stimulative device of the present invention for use by one or more birds.
Figure 1B:
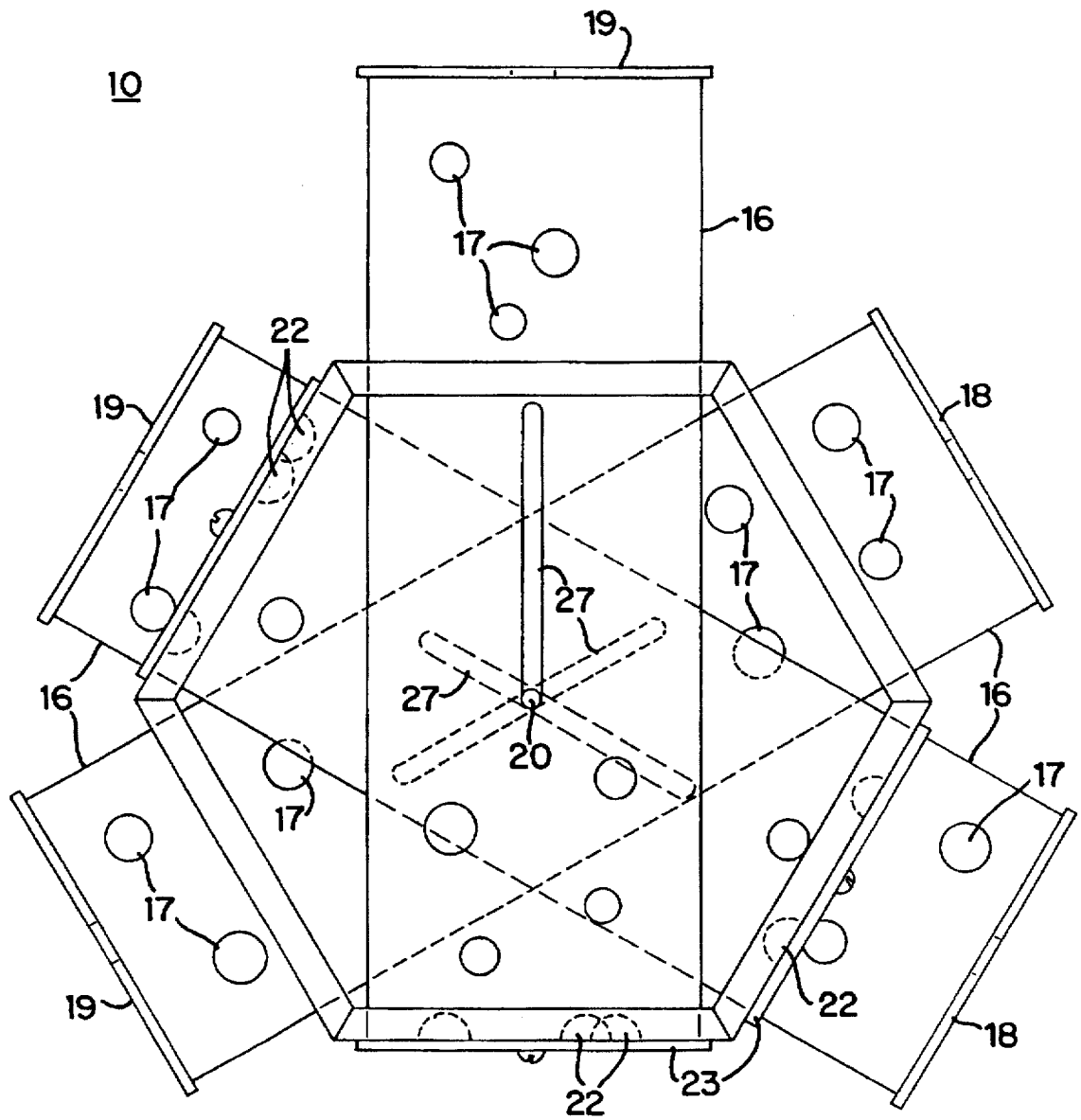
FIG. 1B is a top view of the stimulative device shown in FIG. 1A.

The device 10 illustrated in FIGS. 1A and 1B is for use by birds, captive ones for the most part. The particular dimensions may be varied depending upon the size and number of birds using the device 10. Similarly, the number and style of supplemental components forming part of the basic opaque structure 11 are also variable. Nevertheless, for illustrative purposes, the device 10 shown in FIGS. 1A and 1B is directed to use by passeriforme and/or psittaciforme groups of birds. The device 10 includes the basic structure 11 as a set of structure walls 12 joined together by standard attachment means such as an adhesive or mechanical components such as screws, welds, or bolts. The structure walls 12 are preferably joined together so as to form an octagon or a hexagon; however, it is to be understood that other configurations may be produced as desired. The structure walls 12 may be fabricated of any suitable material, including plastic or, preferably, metal. A structure top 13 provides for insertion of a coupling rod 20 that extends down through the center of the basic structure 11 and terminates at a knob hook 14 at the top 13. The coupling rod 20 is detachably removable from the structure 11 by removing it from rod attachment means at a bottom 15 of the structure 11. The rod attachment means may simply be a threaded hole at the bottom 15 wherein the coupling rod can be threaded to the hole by rotation of the knob hook 14.

The coupling rod 20 of the structure 11 shown in FIGS. 1A and 1B is designed to retain drawers 16 that are removably insertable into drawer cavities 17 formed in the structure walls 12. The drawers 16 may be one set of means for hiding food in the device 10. The drawers 16 may also be used as a perch by a bird, or for any other animal using the structure shown in that figure. Each of the drawers 16 is locked within the structure 11 by the coupling rod 20, which extends through a slot 27 of each drawer of the structure 11. As a first drawer end 18 is pulled outward by the animal, a second drawer end 19 is pulled in toward the center of the structure 11. The coupling rod 20 prevents the drawer 16 from being completely removed from the structure 11. Of course, when it is necessary to remove one or more of the drawers 16, the coupling rod 20 may be removed from the rod attachment means and withdrawn from the center of the structure 11.

The drawers 16 preferably include one or more drawer cavities 17 for insertion of food for the animal. The animal is required to push and pull the drawers 16 out from the structure walls 12 in order to expose the drawer cavities 17 and the food therein. Movement of the drawers 16 also produces noise and creates an entertaining activity for the animal. Structure wall cavities 22 provide additional food-hiding spaces for easier food recovery by the animal. Cavity blocking means such as blocking elements 23 are rotatably affixable to the structure walls 12 so that they may be moved by the animal to expose wall cavities 22 thereunder. The drawer cavities 17 and the wall cavities 22 may be varied in number, shape, and dimensions as a function of the animal for which the device 10 is intended. The device 10 is placeable on a foundation or it may be suspended within the animal's container.

An additional food-hiding component of the device 10 may include a rod that may or may not be threaded and that is joined to the opaque structure may be moved outwardly from the surface of the structure by the animal so as to expose one or more food cavities dispersed along the length of the rod. Stops at the interior ends of the rod prevent the animal from removing it completely from the opaque structure. With this arrangement the animal is required to twist the rod outwardly and recover the food that may be located in the cavities. Of course, threading of the rod increases the effort required by the animal to recover the food. This arrangement is substantially similar to the rotatable knobs 110 to be described hereinafter with respect to FIG. 11.

It can readily be seen that a device of the type presented in FIG. 1A and 1B may be adapted for use by non-captive animals that may be commonly observed living outside of a confining environment. For example, the device 10 may be placed outside such that wild birds will use it. Squirrels and other creatures that occasion common bird feeders may also be attracted to the device 10.

Figure 2:
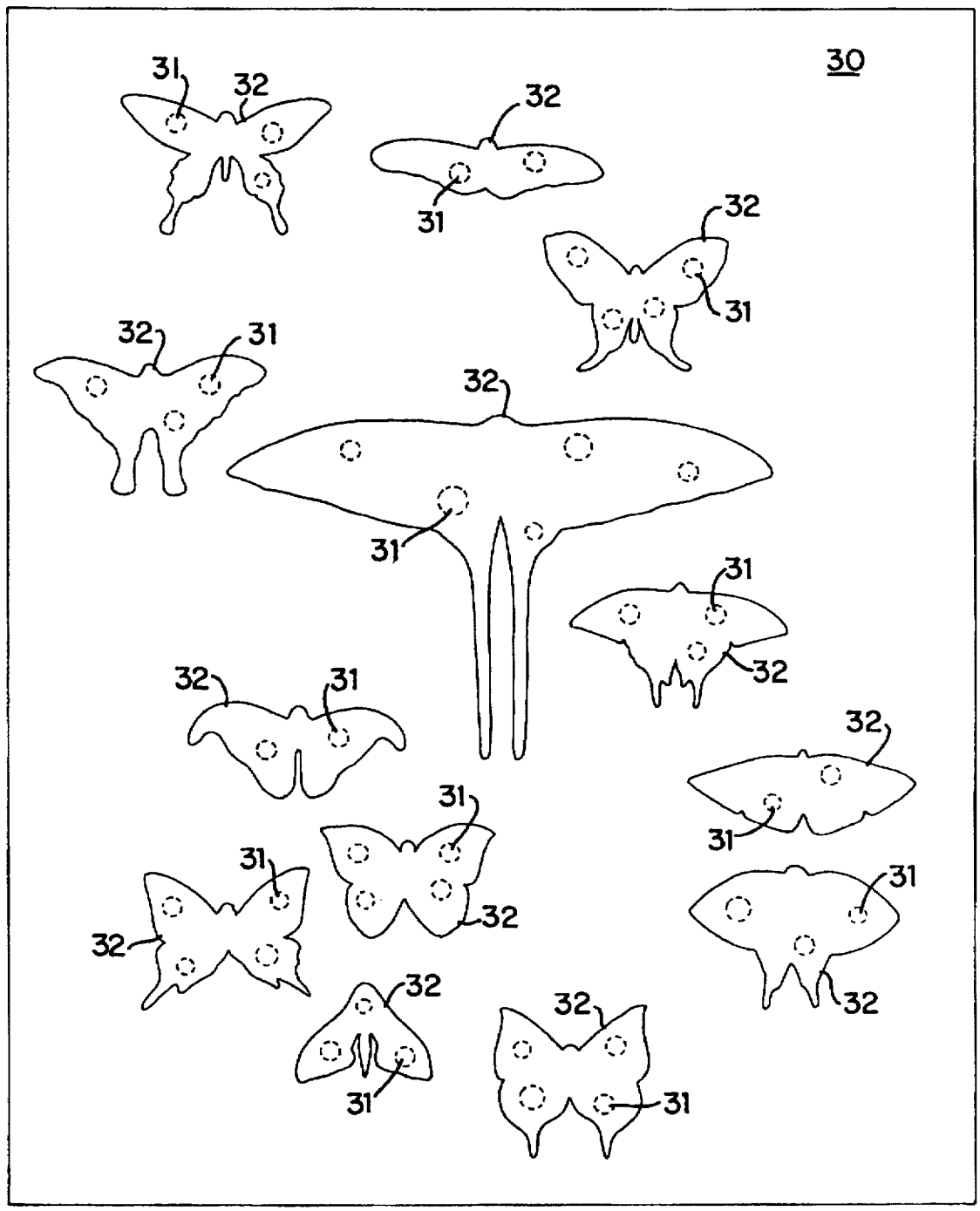
FIG. 2 is a front view of a first embodiment of the stimulative device of the present invention for use by one or more animals.

The device 10 illustrated in FIG. 2 is a second, more generic, stimulative device than the device 10 shown in FIG. 1 in that it may be used for a variety of animals. It includes a basic device structure 30 that is essentially a solid piece of opaque material having a plurality of structure cavities 31 for retaining food. The cavities 31 may be varied in number, size, shape and dimensions as a function of the particular animal using the device 10. For primitive animals, leaving the cavities 31 completely exposed may be sufficient to keep the animal occupied for an extended period of time searching for and recovering the food within. For more intelligent animals, a portion or all of the cavities 31 may be covered with blocking devices 32 that are designed to be pivotably movable. The animal is required to move the blocking devices 32 so as to reveal the cavities 31 thereunder. While the blocking devices may be simple geometric shapes, it is preferable to include one or more such blocking devices in the shapes of insects, or any flora or fauna that may pique the interest of the particular animal. The animal is required to move each and every blocking device 32 removably attached to the basic device structure 30 in order to reveal the cavities 31, some or all of which may contain food. The device 10 shown in FIG. 2 is designed to be attached to the exterior of the animal's container, with the blocking devices 32 revealed to the animal. The cavities 31 are preferably formed at a slight downward angle from the opening so as to more easily retain food therein, particularly for those cavities 31 that have no blocking devices 32.

Figure 3:
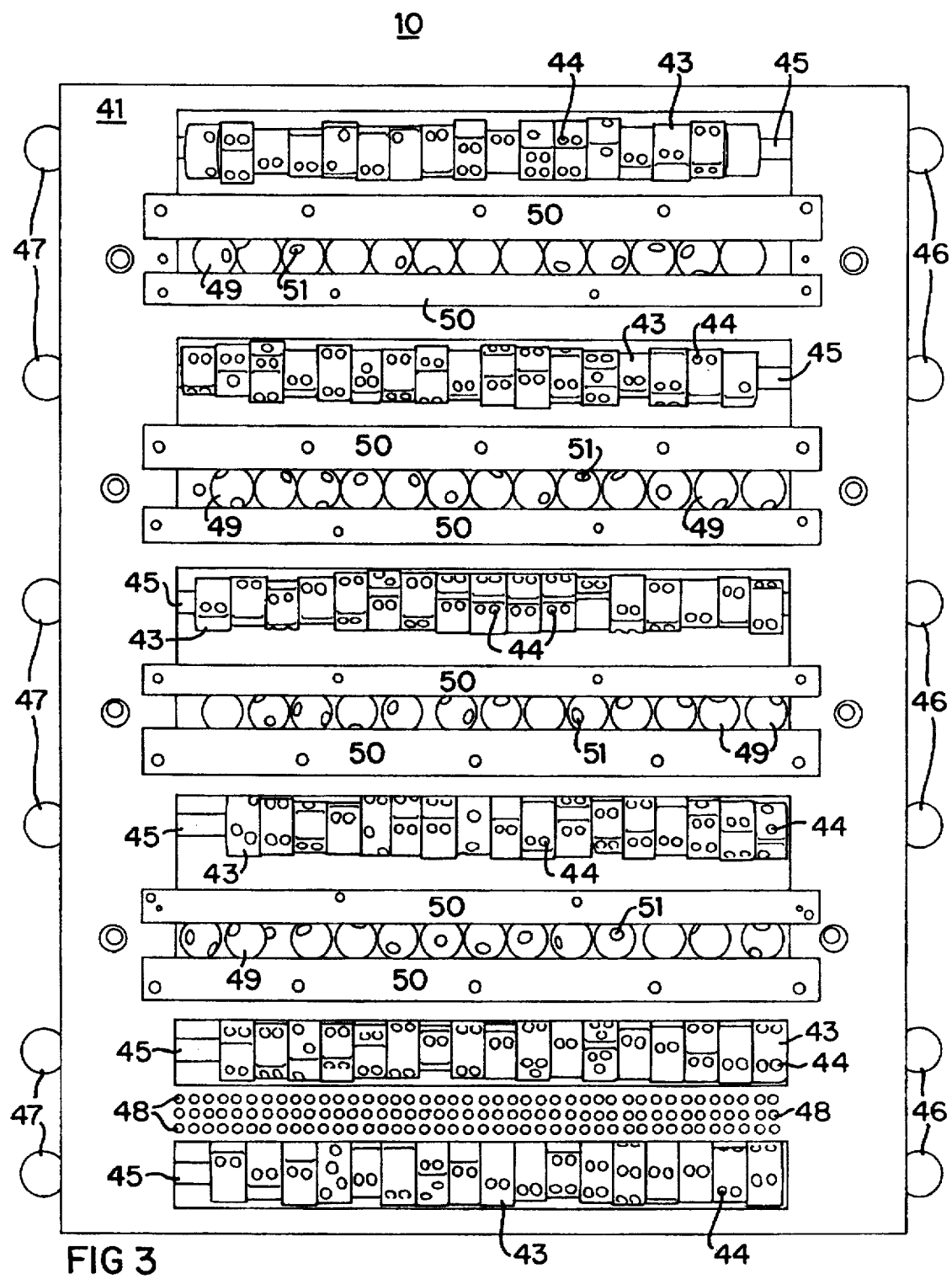
FIG. 3 is a front view of a second embodiment of the stimulative device of the present invention for use by one or more primates.
Figure 4:
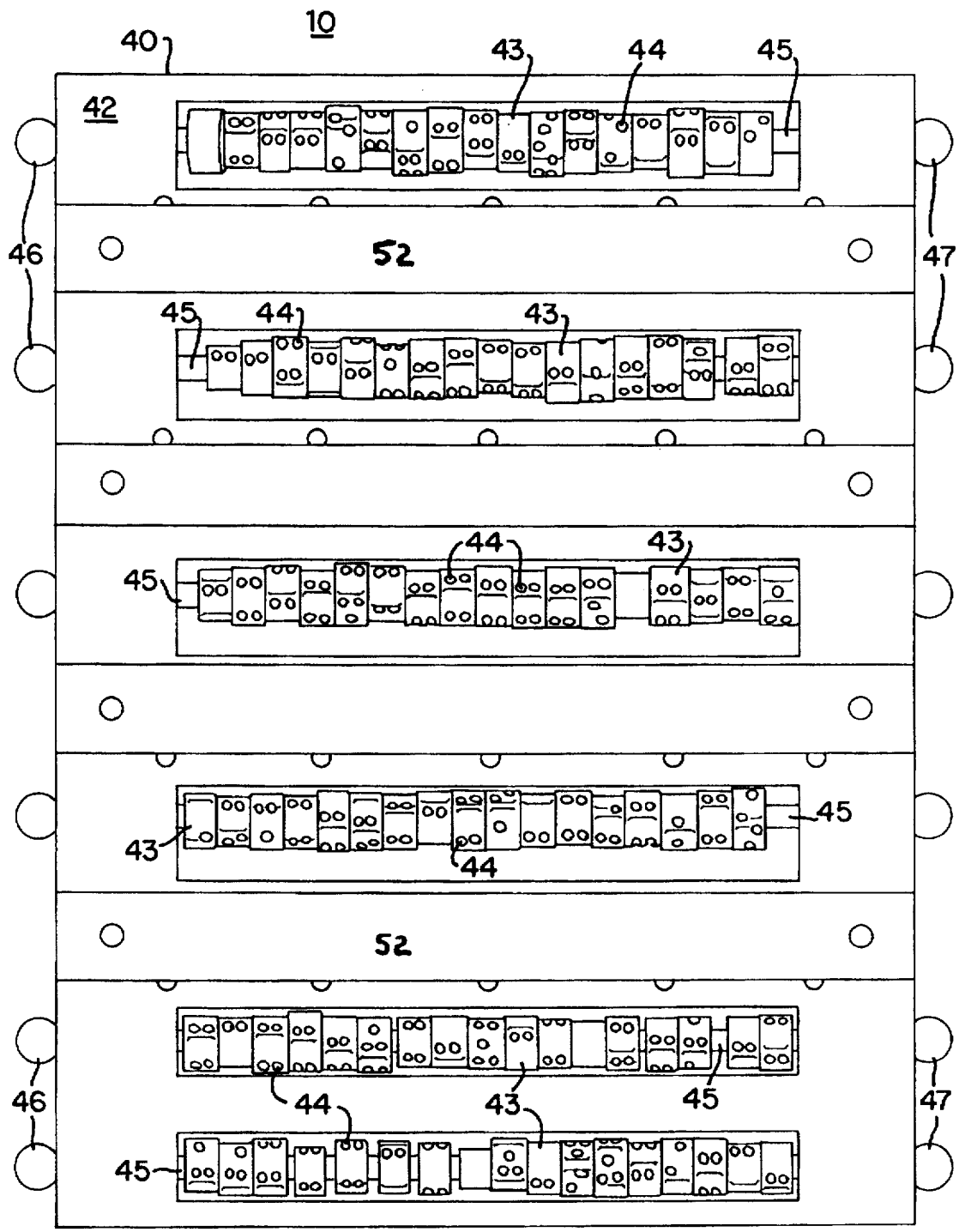
FIG. 4 is a rear view of the second embodiment of the stimulative device of the present invention shown in FIG. 3.

The stimulative device 10 shown in FIGS. 3 and 4 was designed particularly for primate usage, although it may be usable by other animals as well. The device 10 shown in those figures includes an opaque device structure 40 that includes a front section 41 and a rear section 42. The front section 41 is designed to be revealed to the animal while the rear section 42 is designed to be hidden from the animal's view. The device 10 shown in FIGS. 3 and 4 includes a plurality of sets of rotatable blocks 43, with block cavities 44, wherein the rotatable blocks are captured on a rotation rod 45. The animal is required to spin the blocks 43 so as to reveal food within the block cavities 44. The rotation rod 45 terminates in a first rod knob 46 and a second rod knob 47, either of which may be removed to withdraw the rotation rod 45 in order to gain access to the rotatable blocks 43. The rotation rod 45 may be threaded into either one or both of the rod knobs 46,47, or the knobs themselves may be removably attachable to sidewalls of the basic device structure 40. In this way, the animal cannot remove the rotatable blocks 43 from the structure 40, while the animal's provider can easily do so in order to fill, replace, or otherwise maintain the blocks 43.

The structure 40 may contain only the blocks 43 captured on the rotation rod 45. However, in order to provide added stimulus to the animal, it is preferable to include other food-retaining components as part of the device 10 shown in FIGS. 3 and 4. Simple structure cavities 48 on the front section 41 may be used to entice the animal to discover more food in hidden food cavities. Sets of spheres 49 captured within sphere retention means 50 may also be used to hide food within sphere cavities 51. The spheres 49 are designed to be movable within the retention means 50 so as to expose the sphere cavities 51 spaced intermittently on the spheres 49. Access to the spheres 49 and the sphere cavities 51 is possible through the rear section 42 of the structure 40 by way of access walls 52 that are removably attached to the rear section 42. Food can easily be inserted in cavities 44 and 51 via the rear section 42, with the structure cavities 48 requiring filling from the front section 41. While the geometric components shown in FIGS. 3 and 4 are presented as blocks 43 and spheres 51, it is to be understood that any shape may be used, provided it can be moved by the animal to reveal hidden food. In this way, the device 10 of the present invention simulates the foraging requirements for the captive animal. As earlier noted, it is preferable to form the various cavities, particularly the "unblocked" cavities, at a slight downward angle so as to prevent food from easily falling out of these cavities.

The device 10 shown in corresponding FIGS. 5 and 6 again includes a basic opaque device structure 60 made out of any suitable material, including, but not limited to, wood, metal, or high-strength plastic. The specific device shown in these figures includes structure cavities 61 for retaining food within the structure 60 and slots 62 for retaining sets of slidable spheres 63 that include sphere cavities 64 for retaining food. The animal is required to move the spheres 63 in the slots 62 in order to expose food contained in the sphere cavities 64. End spheres 65 terminate the set of spheres 63 that are arrangeable in an ornate fashion so as to retain the interest of the animal and to give the animal an activity when the food is finished. This particular design makes it difficult for the animal to ascertain whether all food has been discovered. That is because the time required to go through each sphere 63 is long enough that the animal has a tendency to repeat the search in order to be sure that all of the food has been found.

Figure 5:
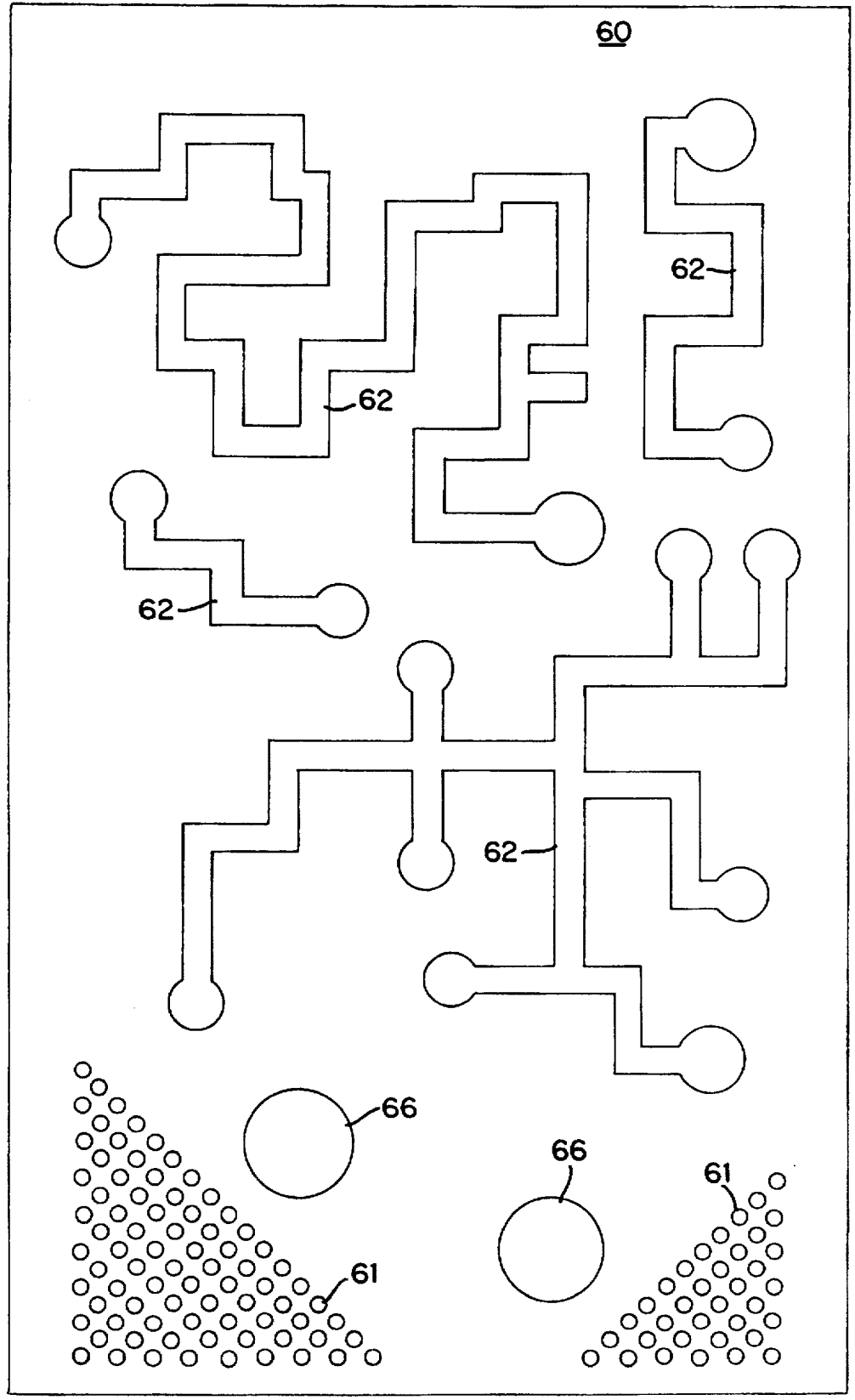
FIG. 5 is a front view of a third embodiment of the stimulative device of the present invention for use by one or more primates.
Figure 6:
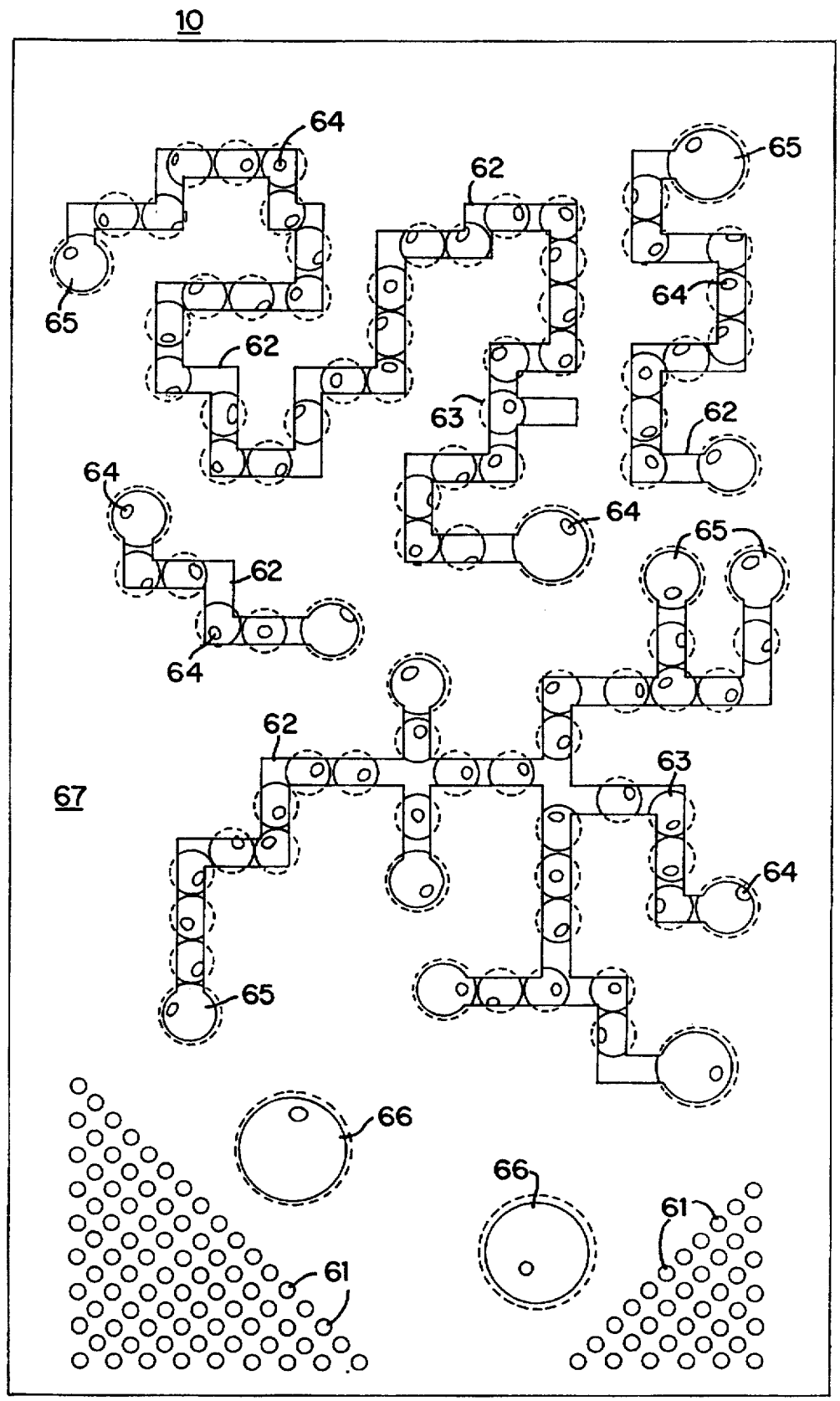
FIG. 6 is a front view of the third embodiment of the stimulative device of the present invention shown in FIG. 5, including supplemental blocking devices in retaining slots.

A supplemental feature of the device 10 shown in FIGS. 5 and 6 are through holes 66 through which the animal, particularly a primate, may place its arm. This is not unlike the efforts the animal goes through in the wild when it finds a hole in a log, etc. The animal naturally places its hand in the hole and gropes for food within. The through holes 66 extend completely through a front structure surface 67 to the back of the structure 60. Structure cavities 61 on the back side of the opaque structure 60 cannot be seen, but are sufficiently close to the through holes 66 that the animal can feel them. A portion or all of the cavities 61 on the back of the structure 60 may contain food. This arrangement may be applied to any of the opaque structures described herein. They are especially useful in occupying the animal's time in foraging for food as the animal can never be certain that all cavities have been searched and all available food has been discovered.

Figure 7:
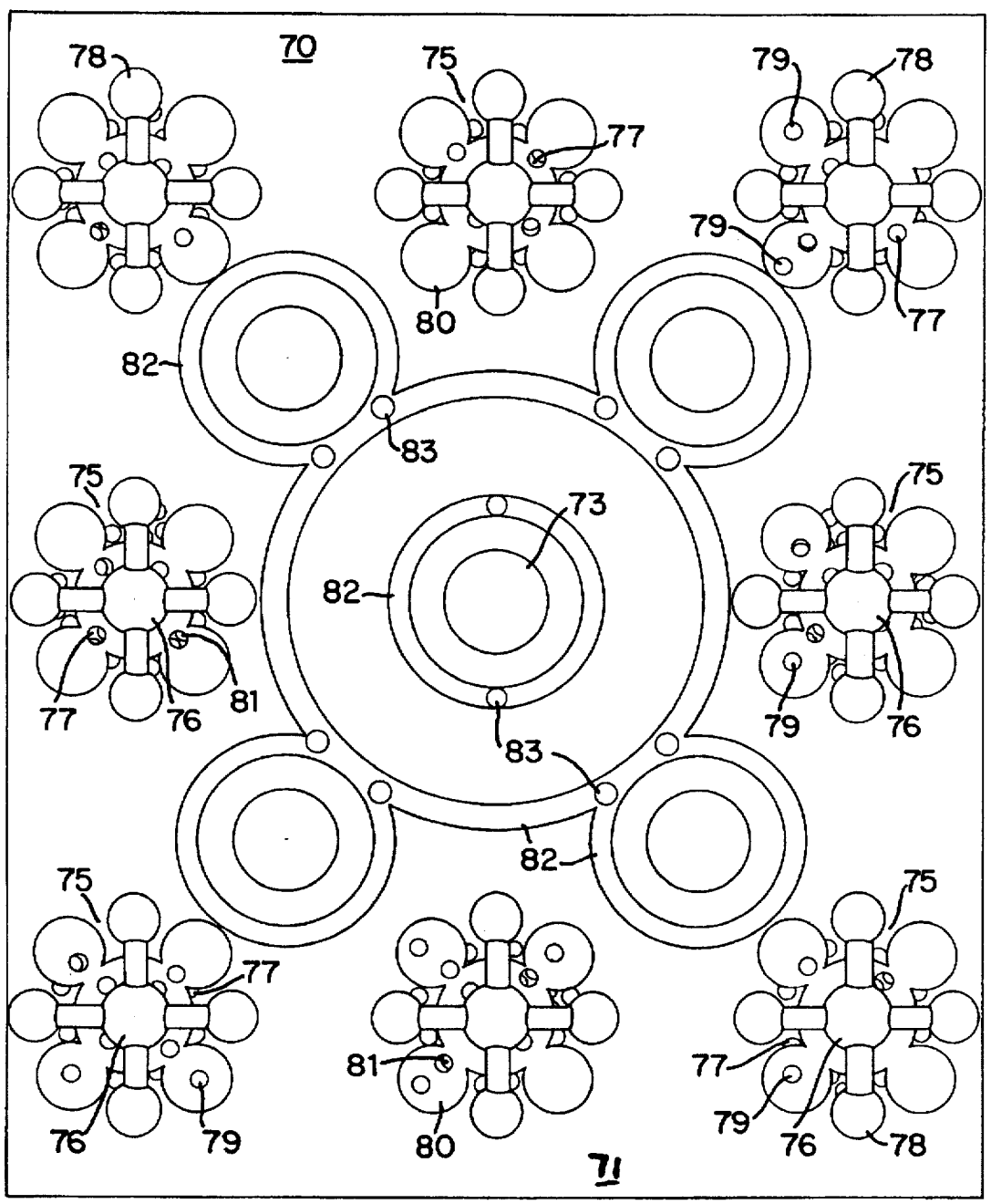
FIG. 7 is a front view of a fourth embodiment of the stimulative device of the present invention for use by one or more primates.
Figure 8:
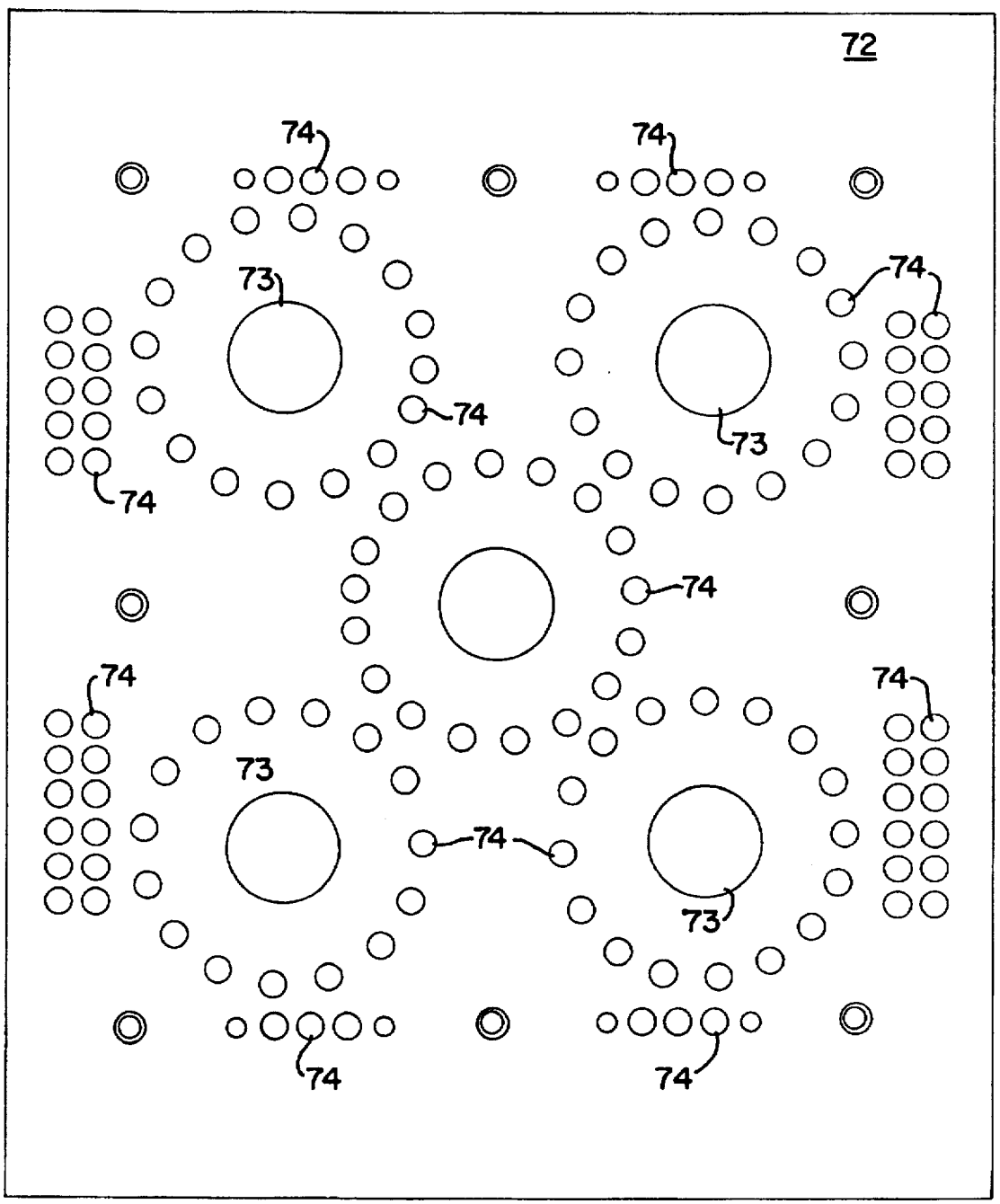
FIG. 8 is a rear view of the fourth embodiment of the stimulative device of the present invention shown in FIG. 7.
Figure 9:
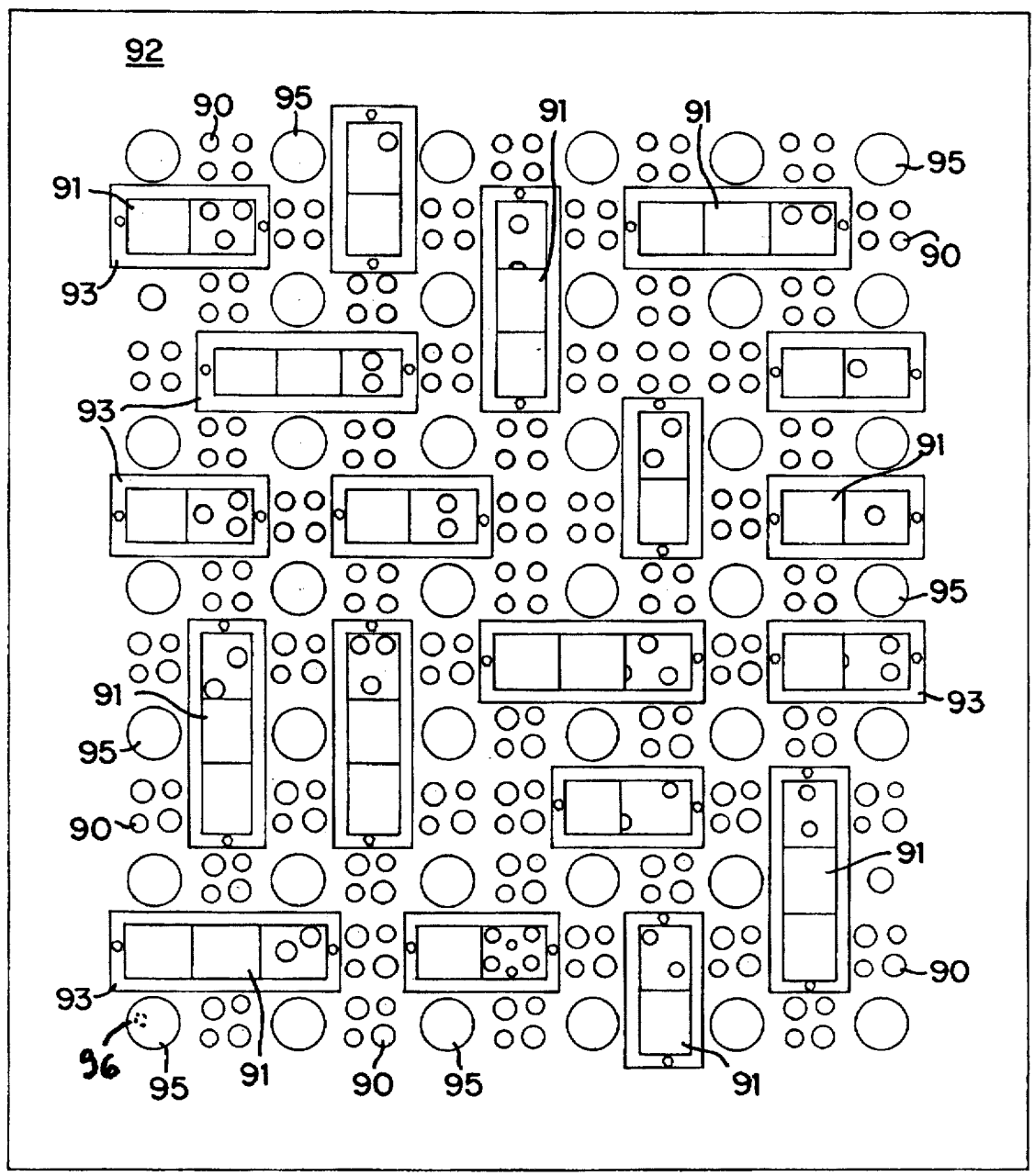
FIG. 9 is a front view of a fifth embodiment of the stimulative device of the present invention for use by one or more primates.

The device 10 shown in FIGS. 7 and 8 includes a basic opaque device structure 70 made out of any suitable material, including, but not limited to, wood, metal, or high-strength plastic. The structure includes a front structure section 71 and a rear structure section 72. The front section 71 is designed to be exposed to the animal and includes a plurality of large through holes 73 by which the animal may reach rear cavities 74 that may contain food, as noted in the discussion of the device 10 shown in FIGS. 5 and 6. The front section 71 also includes a set of rotatable sphere groups 75 that can be rotated at a center thereof on a sphere base 76. The sphere groups 75 may be rotated so as to expose base cavities 77 thereunder, where the base cavities may be filed with food for the animal to discover. Individual spheres 78 may also be rotatable and may include sphere cavities 79 for retaining food. Movable disks 80 may be attached to the front section 71 in close proximity to the sphere base 76 and include disk holes 81 that can be used to expose cavities in the front section 71 when the disks 80 are rotated by the animal. This device 10 is somewhat more complex in that the animal is required to move both the sphere groups 75 and the disks 80 in order to reveal all of the food available. The front section 71 of the structure 70 may also include structure slots 82 that may be used to retain spheres 78 therein and slot cavities 83 thereunder for further stimulation of the animal's foraging capabilities. The arrangement size, and number of the slots 82 and the sphere groups 75 may be varied as desired as a function of the particular animal, the number of animals for which the device 10 is intended, and the size of the container on or in which the device 10 is to be placed. Maintenance and filling of the device 10 shown in FIGS. 7 and 8 is relatively simple in that the cavities designed to hold food are relatively easy for a human to expose. The food can be placed in the cavities without dismantling sections of the device 10.

The remaining devices 10 shown in FIGS. 9–12 are essentially variations on the same theme for stimulation of primates, although the devices 10 shown may be adaptable to other animal types, as can readily be seen by those involved with captive animals. As noted, the goal of the design of the device 10 of the present invention is to provide a stimulating environment for a captive animal, an environment that is not designed to "train" the animal but that is instead designed to apply the natural foraging skills of the animal to a particular required activity—obtaining food. The device 10 shown in FIG. 9 achieves this with a plurality of food-storing cavities 90 that may be covered with blocking devices 91. The blocking devices 91 of this particular device 10 are slidable doors 91 retained on an opaque basic structure 92 within door-retention slats 93 affixable to a front section 94 of the structure 92. Rotatable knobs 95 that may be pulled partially away from the front section 94 may also form part of the device 10 and may include cavities 96 on a stem 97 of the knobs 95.

Figure 10:
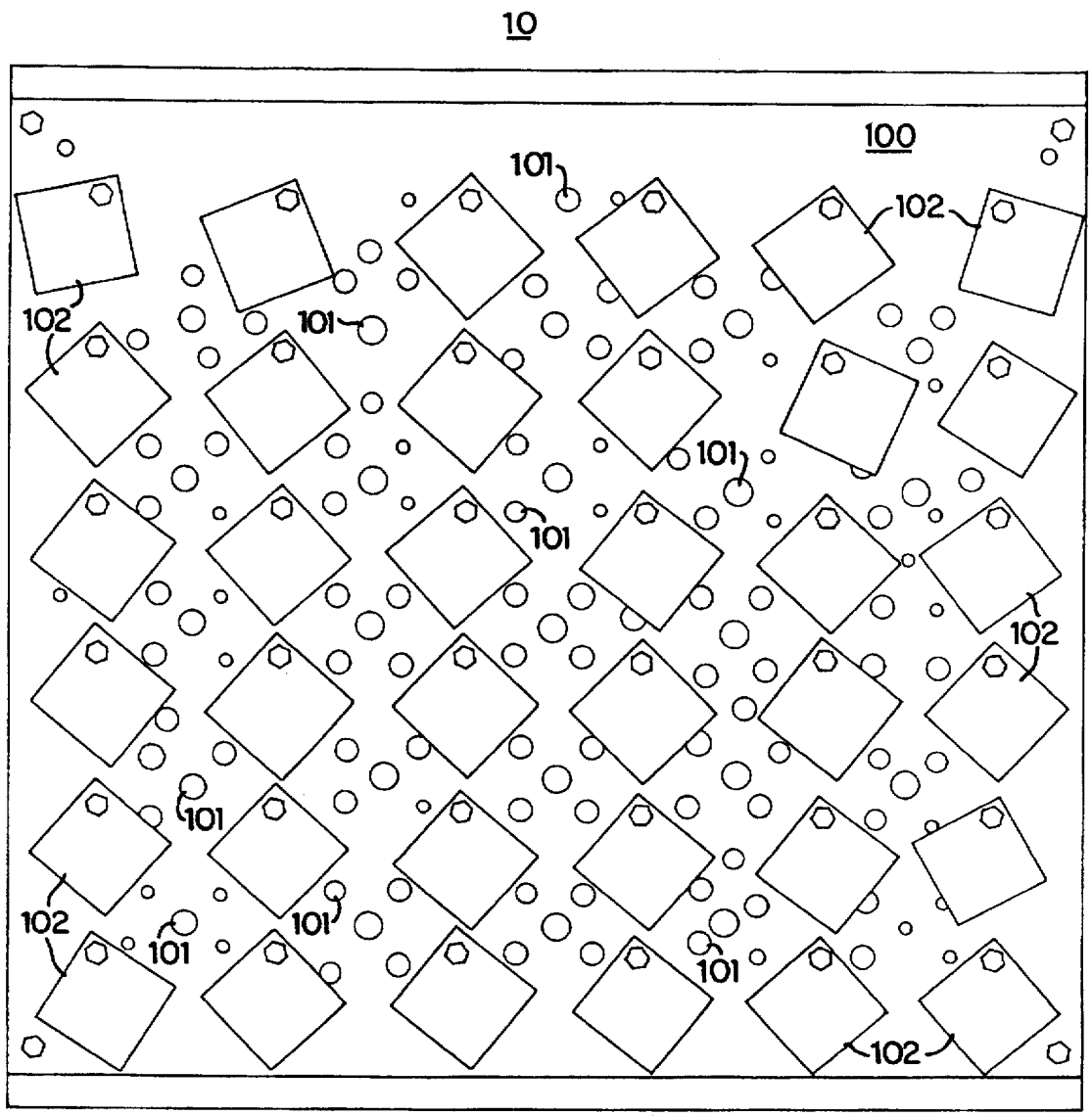
FIG. 10 is a front view of a sixth embodiment of the stimulative device of the present invention for use by one or more primates.

The device 10 shown in FIG. 10 is a relatively simple version of the previous devices described in that it includes only cavities 101 formed within a basic opaque structure 100. The cavities 101 may be filled with food. A portion of the cavities 101 may be covered with movable blocking pieces 102 that may be pivoted by the animal to expose some of the cavities 101 while covering others. The device 10 of FIG. 10 occupies the animal's time by requiring the animal to move all of the blocking pieces 102 to discover its supply of food. It is also entertaining in that the animal can play with the swinging blocking pieces 102 for an extended period of time.

Figure 11:
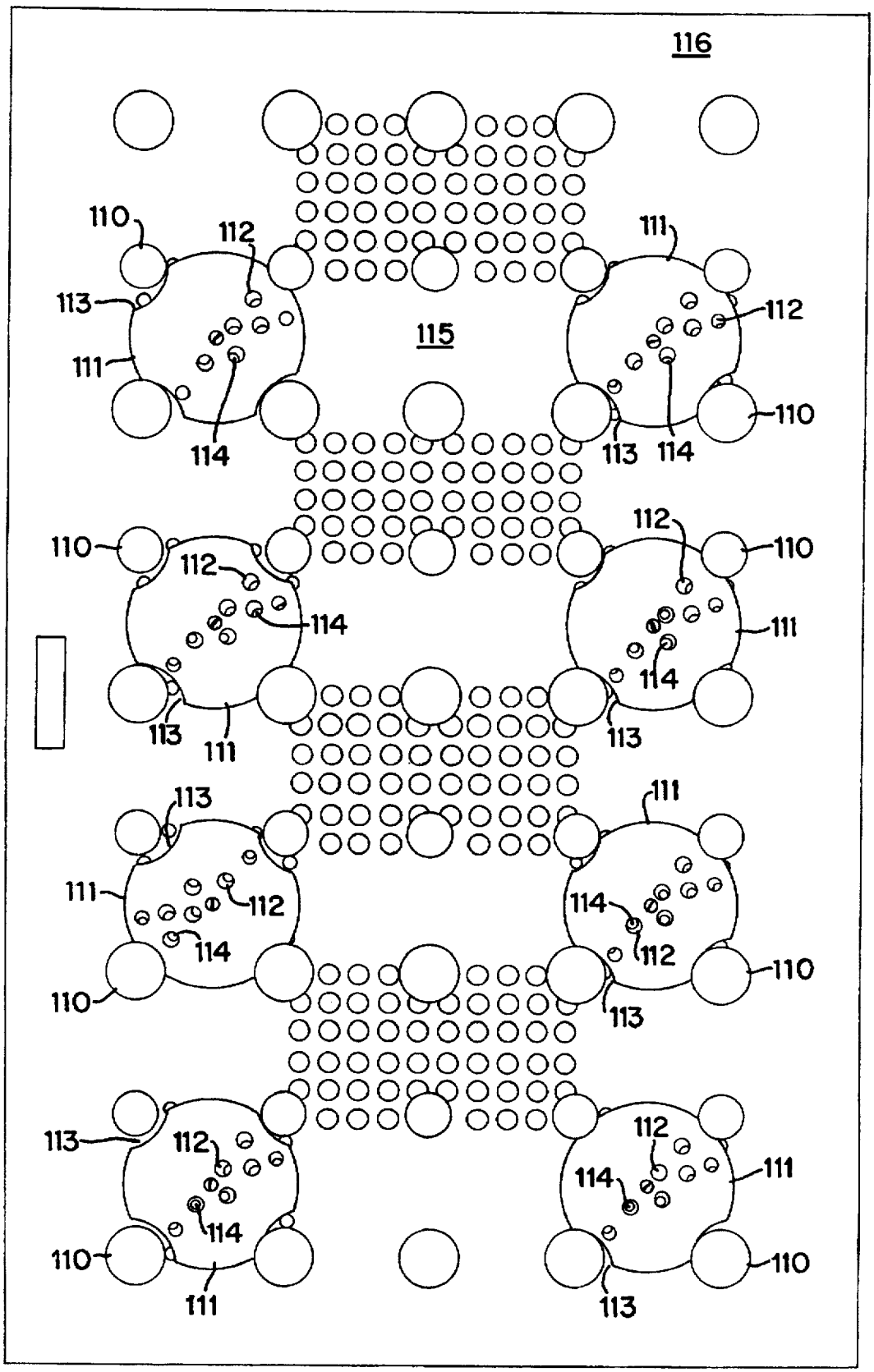
FIG. 11 is a front view of a seventh embodiment of the stimulative device of the present invention for use by one or more primates.

The device 10 shown in FIG. 11 is a bit more complex than that shown in FIG. 10, and is similar to the device 10 shown in FIGS. 7 and 8 in that it requires the animal to align more than one set of blocking pieces in order to reveal cavities filled with food. In particular, the device 10 of FIG. 11 includes sets of rotatable knobs 110 that form perimeter fixtures for rotatable disks 111. The disks 111 include randomly spaced disk cavities 112 and disk keyways 113. The animal is required to align the keyways 113 with the rotatable knobs 110 in order to be able to rotate the disks 111. The disks 111 must then be rotated so as to align the disk cavities 112 with underlying structure cavities 114 formed in a front surface 115 of a basic opaque structure 116 that is similar to the basic opaque structures previously described. The disk cavities 112 as well as the structure cavities 114 may be filled with food as desired. The rotatable knobs 110 may be detachably affixed to the structure 116 so that they be pulled partially away from the front surface 115 in order to expose knob cavities that may be used to store food.

Figure 12:
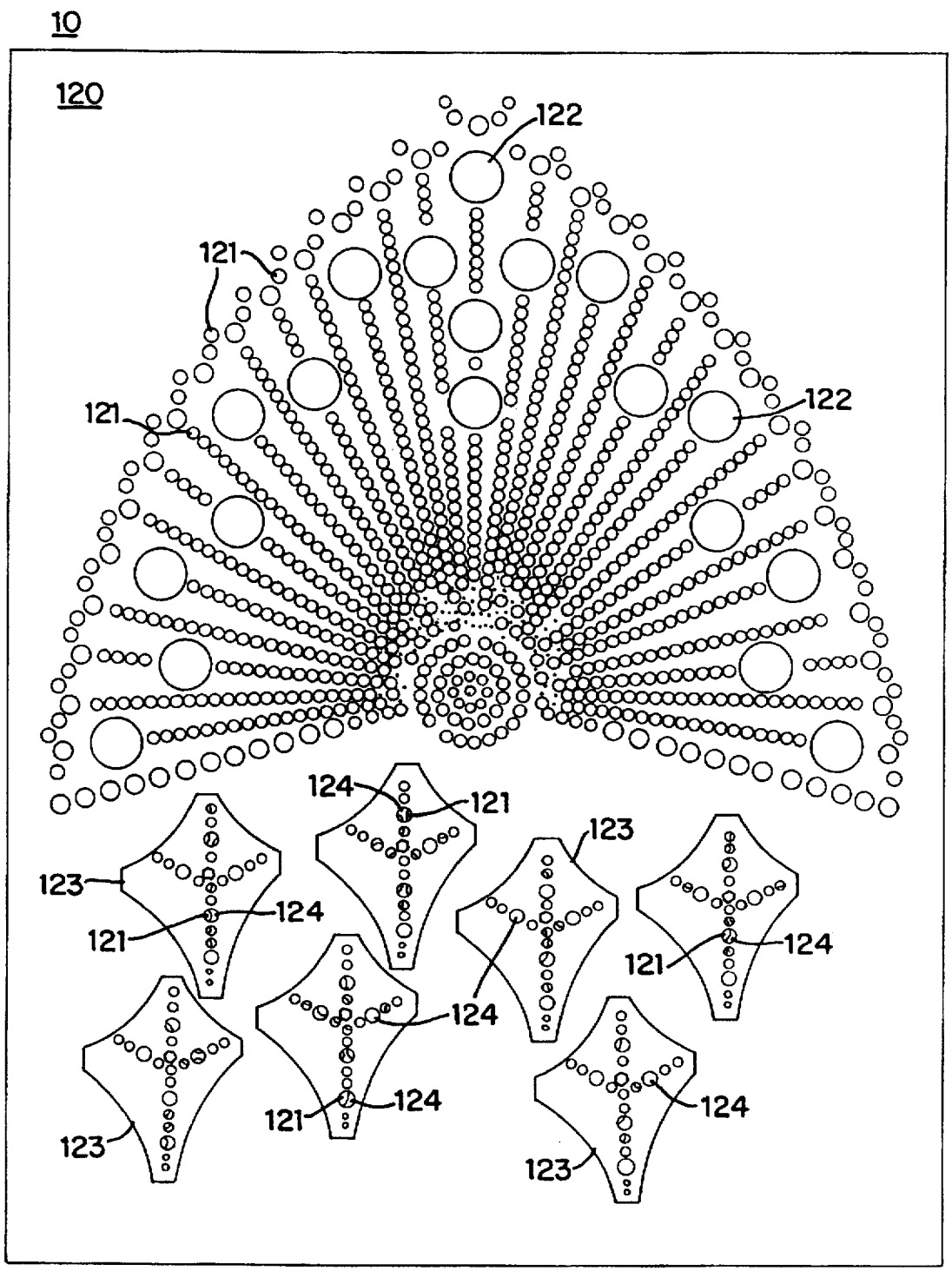
FIG. 12 is a front view of an eighth embodiment of the stimulative device of the present invention for use by one or more primates.

Another embodiment of the present invention is shown in FIG. 12. The device 10 includes a basic opaque structure 120 having a plurality of structure cavities 121, through holes 122, and movable blocking units 123. The structure cavities 121 may be filled with food that is easily observed by an animal. The through holes 122 may be used by the animal to reach a back side of the structure 120 where rear cavities can be searched for food. The blocking units 123 may be of any configuration, including ornate designs that may be interesting for the animal—as well as observing humans—to inspect. The blocking units 123 preferably include unit cavities 124 that, when the blocking units 123 are moved, reveal the structure cavities 121 hidden thereunder.

Figure 13:
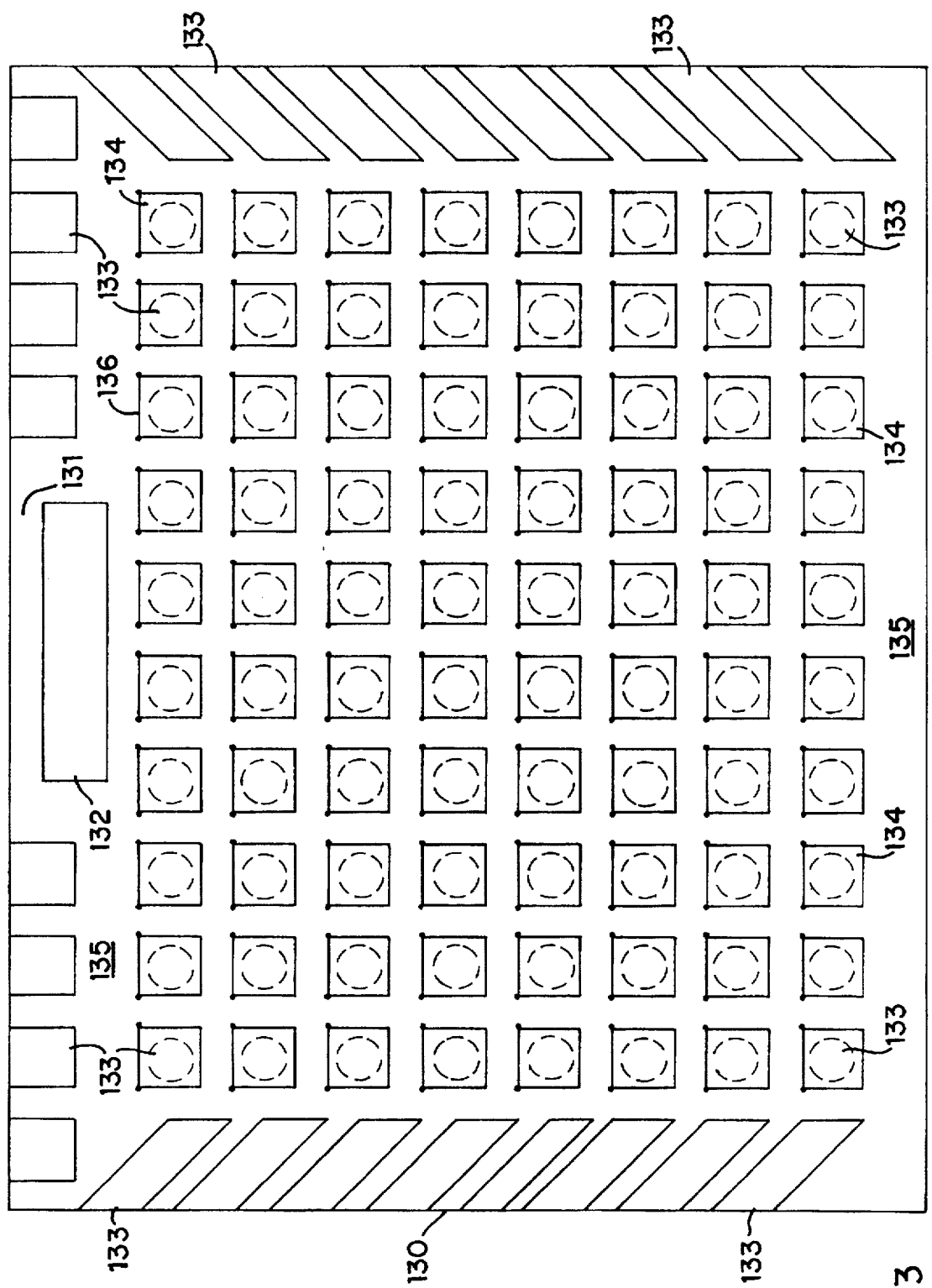
FIG. 13 is a front view of a ninth embodiment of the stimulative device of the present invention for use in substrates designed to simulate natural growths, such as rock formations, trees, termite mounds, earthen floors, etc.

The device 10 shown in FIG. 13 is illustrative of a substrate drawer unit 130 that may be adapted to be removably inserted into any of a variety of artificial substrates, such as the artificial trees, forest floors, termite mounds, rocks, in existence in many zoos. It may also be devised as a stand-alone unit. When applied as part of a substrate, the substrate may be retrofitted with the drawer unit 130, or it may be fabricated as part of the original substrate. On at least a drawer face 135 of the device 10, cover doors 134 hide drawer cavities 133, wherein an animal can open the doors 134 to access the cavities 133 in which food may be located. Door hinges 136 permit the doom 134 to hingedly open and close. The drawer unit 130 includes a handle 131 that is used to pull open the drawer unit 130 for insertion of food therein. A device user simply places his or her hand into a handle opening 132 and pulls the handle 131 downward to gain access to the interior of the drawer unit 130. In that way, the cavities 133 may be accessed for insertion of food to be recovered by the animal. Cavities 133 located on sides of the device 10 may be open for easy access by the animal. The cavities 133 are preferably formed at a slight downward angle so as to prevent food from falling out upon relatively slight movement of the device 10.

Figure 14:
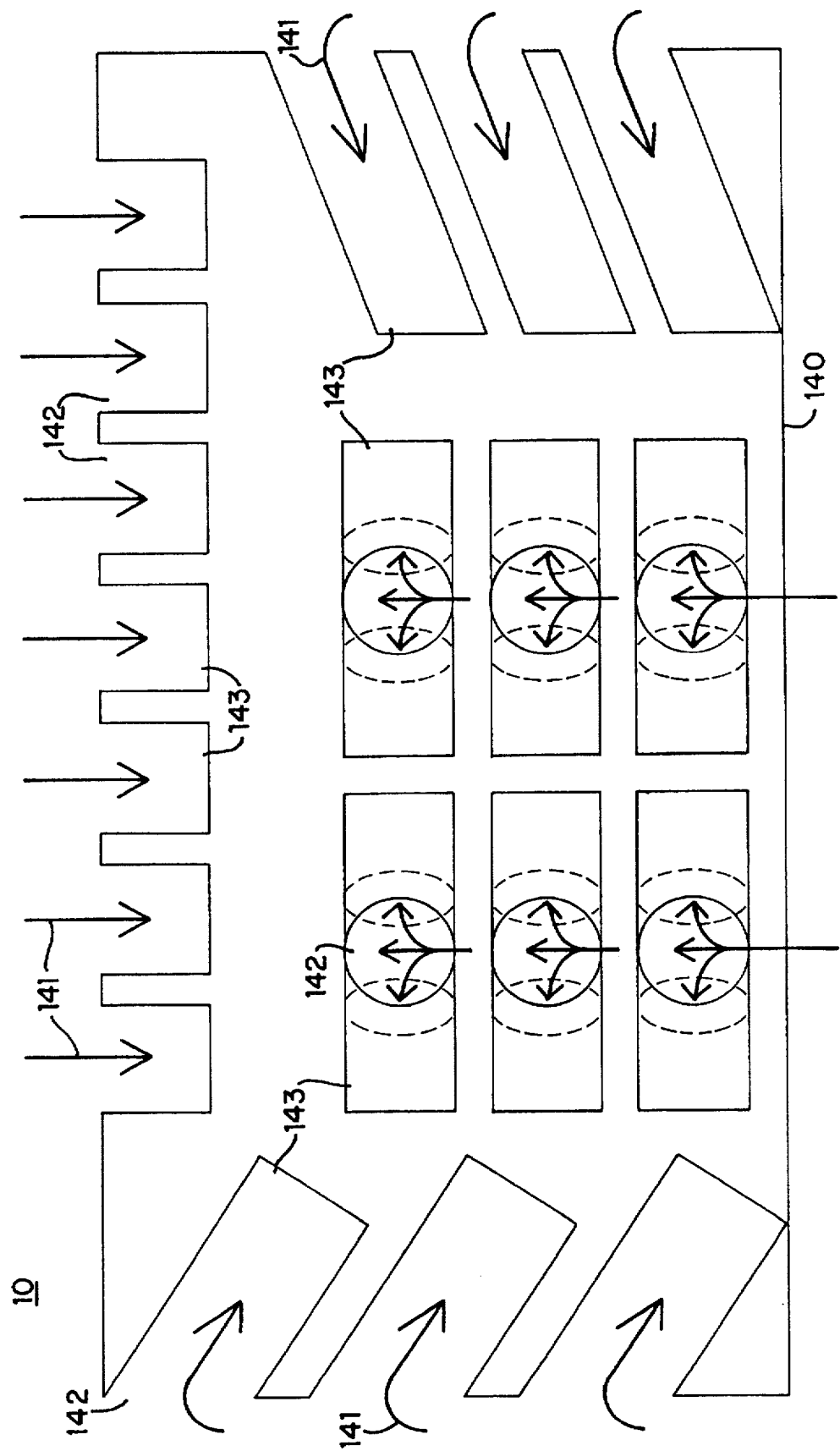
FIG. 14 is a front view of a tenth embodiment of the stimulative device of the present invention for use by reptiles such as snakes.

The device 10 illustrated in FIG. 14 may be used by any animal small or agile enough to gain entry to device passageways 143 of a device structure 140. The device 10 shown in FIG. 14 is especially suitable for reptiles, including snakes in particular. The animal's movements, shown by arrows 141, involve entry into the passageways 143 by way of device openings 142. Some or all of the device openings 142 may or may not be covered with blocking means designed to be movable by the animal for which the device 10 is intended.

In the device 10 shown in FIG. 14, the animal has a choice of passageways 143 through which to travel, as a function of the direction in which it turns. The passageways 143 selected for travel by the animal is preferably controlled by placement of enticing indications of the presence of food. The passageways 143 may be connected to one another so as to produce a maze-like structure. Alternatively, the passageways 143 may be isolated and extend only a short distance from the device openings 142. If the device 10 is used for a snake for example, the enticement may be the scent of a rodent that has been placed within the device structure 140. The rodent may be placed so that it takes the snake an extended period of time to determine where the rodent is located. Given the eating habits of such animals, such a time frame is not unreasonable. Of course, as with the other devices described herein, the device structure 140 may be fabricated of any suitable material, preferably a high-strength plastic or a metal. Further, it can readily be seen that the device arrangement of the type presented in FIG. 14 may be custom-designed for a wide array of other creatures of similar type. It is also to be noted that the configurations presented are designed to permit relatively easy maintenance, particularly when sterilization of the device is of importance—as it generally is.

As previously stated, the various stimulative feeding units presented in the accompanying drawings is not exhaustive, but is instead a set of exemplars of the basic functioning device. The basic opaque structure used to store food may be as simple as a rectangular block of wood, metal, or plastic, it may be a shaped simple geometric structure, such as a hexagon, an octagon, etc., or it may be a complex shape, such as one appearing to be a structure of the type the animal would observe in its natural environment—a tree, a rock, etc. For these reasons, the embodiments presented herein may be implemented in a variety of forms. The true scope of the invention should therefore not be limited to those embodiments alone, but instead includes all equivalents and modifications apparent to those skilled in the art in light of the specification and following claims.

I claim:

1. A natural-habitat-simulating foraging device for use by an animal wherein said device permits said animal to obtain food using foraging techniques natural to said animal, said device comprising: a primary opaque holding structure having a front face, a back face, and one or more holes extending from said front face through to said back face, said primary opaque holding structure including a plurality of cavities formed in said front face and said back face for receiving food, wherein said cavities are configured so as to require said animal to use its natural foraging characteristics in order to remove food from said cavities, wherein said cavities in said back face are not visible to said animal, and wherein said one or more holes extending from said front face through to said back face are designed such that said animal must reach therethrough in order to retrieve food from said cavities in said back face.

2. The device as claimed in claim 1 wherein at least one of said cavities is of a dimension requiring said animal to use a supplemental tool to obtain food located therein.

3. The device as claimed in claim 1 further comprising at least one movable blocking device attachable to said front face of said primary holding structure, wherein said blocking device is designed to hide one or more of said cavities.

4. The device as claimed in claim 3 wherein said at least one movable blocking device is attachable to said primary holding structure by one or more attachment means such that said blocking device freely swings thereon when said animal moves said blocking device to expose said cavities.

5. The device as claimed in claim 3 wherein said blocking device is attachable to said primary holding structure by slot means such that said blocking device slides within said slot means when moved by said animal to expose said cavities.

6. The device as claimed in claim 3 wherein said blocking device includes one or more through holes and wherein said blocking device with said through holes is rotatable on said front face of said primary holding structure so that said animal is required to align said through holes with said cavities.

7. The device as claimed in claim 1 further comprising at least one supplemental holding structure attachable to said primary holding structure, said supplemental holding structure including one or more cavities for receiving food.

8. The device as claimed in claim 1 further comprising one or more rotatable devices partially extendable from said primary holding structure, wherein each of said one or more rotatable devices includes one or more cavities for receiving food.

9. A natural-habitat-simulating foraging device for use by a bird wherein said device permits said bird to obtain food using foraging techniques natural to said bird, said device comprising: a primary opaque holding structure having a plurality of faces, one or more of said plurality of faces including at least one extendable drawer means, wherein said extendable drawer means includes one or more cavities for receiving food, wherein said cavities are configured so as to require said bird to move said extendable drawer means to access said food.

10. The device as claimed in claim 9 wherein at least one of said plurality of faces of said primary opaque holding structure includes a plurality of holes.

11. The device as claimed in claim 10 wherein said primary holding structure includes six faces.

12. The device as claimed in claim 9 further comprising one or more rotatable devices partially extendible from said primary holding structure, wherein each of said one or more rotatable devices includes one or more cavities for receiving food.

13. A natural-habitat-simulating foraging device for use by an animal wherein said device permits said animal to obtain food using foraging techniques natural to said animal, said device comprising: a primary opaque holding substrate having a plurality of extendable drawer means for receiving food retrievable by said animal, wherein said drawer means are configured so as to require said animal to use its natural foraging characteristics in order to remove said food from within.

14. The device as claimed in claim 13 wherein said primary opaque holding substrate is formed in the shape of a tree.

15. The device as claimed in claim 13 wherein said primary opaque holding structure is formed in the shape of a termite mound.

16. A natural-habitat-simulating foraging device for use by an animal wherein said device permits said animal to obtain food using foraging techniques natural to said animal, said device comprising:

a. a primary opaque holding structure having a front face;

b. one or more cavities formed in said front face of said primary holding structure, wherein said one or more cavities are designed to hold food for said animal; and c. one or more movable blocking devices attachable to said front face of said primary holding structure, wherein said one or more blocking devices are designed to hide one or more of said cavities.

17. The foraging device as claimed in claim 16 wherein said one or more movable blocking devices are attachable to said primary holding structure by one or more attachment means such that said blocking devices freely swing thereon when said animal moves said one or more blocking devices to expose said one or more cavities.

18. The foraging device as claimed in claim 16 further comprising drawer means partially extendable outwardly from said front face, wherein said drawer means includes one or more openings for placement of food, and wherein when said animal moves said drawer means said food is exposed for retrieval by said animal.

* * * * *